United States Patent
Feuerhake et al.

(10) Patent No.: US 9,249,240 B2
(45) Date of Patent: *Feb. 2, 2016

(54) GRAFT POLYMERS HAVING OLIGOALKYLENIMINE SIDE CHAINS, PROCESS FOR THEIR PREPARATION AND THEIR USE

(75) Inventors: Robert Feuerhake, Mannheim (DE); Daniel Schoenfelder, Brussels (BE); Hans-Joachim Haehnle, Neustadt (DE); Bernd Bruchmann, Freinsheim (DE); Paola Uribe Arocha, Mannheim (DE); Bastiaan Bram Pieter Staal, Mannheim (DE); Ralph Baumgaertner, Mannheim (DE)

(73) Assignee: BASF SE, Ludwigshafen (DE)

( * ) Notice: Subject to any disclaimer, the term of this patent is extended or adjusted under 35 U.S.C. 154(b) by 121 days.

This patent is subject to a terminal disclaimer.

(21) Appl. No.: 12/744,389

(22) PCT Filed: Dec. 16, 2008

(86) PCT No.: PCT/EP2008/067619
§ 371 (c)(1), (2), (4) Date: May 24, 2010

(87) PCT Pub. No.: WO2009/080613
PCT Pub. Date: Jul. 2, 2009

(65) Prior Publication Data
US 2010/0280203 A1 Nov. 4, 2010

(30) Foreign Application Priority Data
Dec. 20, 2007 (EP) .................................... 07150232

(51) Int. Cl.
| | | |
|---|---|---|
| C08G 69/48 | (2006.01) |
| D21H 17/45 | (2006.01) |
| D21H 21/36 | (2006.01) |
| C08F 8/32 | (2006.01) |
| C08F 8/30 | (2006.01) |
| C08F 271/00 | (2006.01) |
| C08F 290/00 | (2006.01) |
| C08F 290/06 | (2006.01) |
| C08F 290/14 | (2006.01) |
| C08L 51/00 | (2006.01) |
| C08L 51/08 | (2006.01) |
| C09D 151/00 | (2006.01) |
| C09D 151/08 | (2006.01) |
| D21H 17/55 | (2006.01) |

(52) U.S. Cl.
CPC ... *C08F 8/32* (2013.01); *C08F 8/30* (2013.01); *C08F 271/00* (2013.01); *C08F 290/00* (2013.01); *C08F 290/06* (2013.01); *C08F 290/065* (2013.01); *C08F 290/14* (2013.01); *C08F 290/145* (2013.01); *C08G 69/48* (2013.01); *C08L 51/003* (2013.01); *C08L 51/08* (2013.01); *C09D 151/003* (2013.01); *C09D 151/08* (2013.01); *D21H 17/55* (2013.01); *D21H 17/45* (2013.01); *D21H 21/36* (2013.01)

(58) Field of Classification Search
CPC ......... C08F 8/30; C08F 271/00; D21H 17/55; C09D 151/08; C09D 151/003; C08L 51/08
USPC .............................................. 526/307, 307.1
See application file for complete search history.

(56) References Cited

U.S. PATENT DOCUMENTS

| | | | |
|---|---|---|---|
| 3,280,218 A | 10/1966 | Endsley et al. | |
| 3,492,289 A | 1/1970 | Symm et al. | |
| 4,144,123 A * | 3/1979 | Scharf et al. ................ | 162/164.3 |
| 4,275,000 A * | 6/1981 | Ross .............................. | 530/359 |
| 6,132,558 A | 10/2000 | Dyllick-Brenzinger et al. | |
| 6,562,926 B1 | 5/2003 | Decker et al. | |
| 8,283,496 B2 * | 10/2012 | Feuerhake et al. ............. | 564/505 |
| 2002/0131958 A1 * | 9/2002 | Chapman et al. ............. | 424/93.7 |
| 2004/0048998 A1 * | 3/2004 | Klein et al. ...................... | 528/25 |
| 2004/0139559 A1 * | 7/2004 | Detering et al. .................. | 8/181 |
| 2005/0079149 A1 * | 4/2005 | Banerjee et al. ........... | 424/78.27 |
| 2011/0028603 A1 | 2/2011 | Peretolchin et al. | |

(Continued)

FOREIGN PATENT DOCUMENTS

| | | |
|---|---|---|
| DE | 24 34 816 | 2/1976 |
| EP | 1 524 314 | 4/2005 |

(Continued)

OTHER PUBLICATIONS

U.S. Appl. No. 12/680,210, filed Mar. 26, 2010, Feuerhake, et al.
U.S. Appl. No. 13/376,509, filed Dec. 6, 2011, Jehn-Rendu, et al.

*Primary Examiner* — Mark Kaucher
(74) *Attorney, Agent, or Firm* — Oblon, McClelland, Maier & Neustadt, L.L.P.

(57) ABSTRACT

Graft polymers whose grafting base is selected from the group consisting of polymers having vinylamine units, polyamines, polyamidoamines and polymers of ethylenically unsaturated acids and which comprise exclusively oligoalkylenimine side chains as side chains, process for the preparation of graft polymers having oligoalkylenimine side chains, at least one oligoalkylenimine which comprises a terminal aziridine group being grafted onto one of said grafting bases, and the use of the graft polymers thus obtainable as process chemicals in the production of paper, as antimicrobial coating materials, as builders in detergents and for the treatment of metal surfaces.

21 Claims, No Drawings

(56) References Cited

U.S. PATENT DOCUMENTS

2011/0229716 A1   9/2011   Cosyns et al.
2014/0316072 A1*  10/2014  Feuerhake et al. ............ 525/375

FOREIGN PATENT DOCUMENTS

| WO | 01 36500 | 5/2001 |
| WO | WO 2007027566 A2 * | 3/2007 |

* cited by examiner

GRAFT POLYMERS HAVING OLIGOALKYLENIMINE SIDE CHAINS, PROCESS FOR THEIR PREPARATION AND THEIR USE

CROSS-REFERENCE TO RELATED APPLICATIONS

This application is a National Stage of PCT/EP2008/067619 filed on Dec. 16, 2008. This application is based upon and claims the benefit of priority to European Application No. 07150232.2 filed on Dec. 20, 2007.

The invention relates to graft polymers which comprise exclusively oligoalkylenimine side chains as side chains and whose grafting base is selected from the group consisting of polymers having vinylamine units, polyamines, polyamidoamines and polymers of ethylenically unsaturated acids, process for the preparation of graft polymers having oligoalkylenimine side chains, at least one oligoalkylenimine which comprises a terminal aziridine group being grafted onto one of the grafting bases mentioned, and the use of graft polymers thus obtainable as process chemicals in the production of paper, as antimicrobial coating materials, as builders in detergents and for the treatment of metal surfaces.

U.S. Pat. No. 3,280,218 discloses graft polymers of ethylenimine on polyacrylic acid and/or polymethacrylic acid. These are comb polymers which comprise ethylenimine units as side chains. The molar mass distribution of the graft branches formed is broad. The graft branches may consist, for example, of only one ethylenimine unit or a plurality of alkylenimine units. A serious disadvantage of the grafting of polymers with ethylenimine is a very long duration of reaction which is necessary in order to suppress the formation of homopolymers of ethylenimine. The graft polymers are used as wet strength agents in the production of paper.

U.S. Pat. No. 3,492,289 discloses polyalkylenimines having molar masses of from 300 to 3000, which have an intact terminal aziridine ring. They are prepared by polymerization of alkylenimines in the presence of trialkylaluminums, an acid or a Lewis acid as a catalyst in a virtually anhydrous solvent, such as benzene, toluene, n-heptane, cyclohexane or 2-ethylhexane. The polymers can be used as bactericides or as curing agents for epoxy resins.

WO 01/36500 discloses monomers comprising alkylenimine units and of the formula

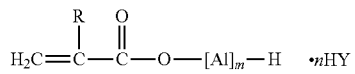

where
R is hydrogen or $C_1$- to $C_4$-alkyl, $-[Al]_m$ is a linear or branched oligoalkylenimine chain having m alkylenimine units,
m is an integer in the range from 1 to 20, and the number average m in the oligoalkylenimine chains is at least 1.5,
Y is the anion equivalent of a mineral acid and
n is a number where $1 \leq n \leq m$.

Monomers or monomer mixtures in which, in the above-mentioned formula, the number average of m is at least 2.1, in general from 2.1 to 8, are preferred. They are obtainable by reacting an ethylenically unsaturated carboxylic acid with an oligoalkylenimine, preferably in the form of an oligomer mixture. The product obtained thereby can, if appropriate, be converted into the acid addition salt with a mineral acid HY. Such monomers can be polymerized in an aqueous medium in the presence of an initiator which initiates a free radical polymerization to give homo- and copolymers which are used as assistants in papermaking.

Further dendritic macromonomers and polymers prepared therefrom are disclosed in EP-A 1 524 314. The macromonomers are prepared, for example, by reacting an adduct of ethylene oxide and polyethylenimine with allyl glycidyl ether. Copolymers of these macromonomers with acrylic acid are used as builders in detergents.

The prior European patent application 07 117 909.7 discloses aminoalkyl vinyl ethers comprising alkylenimine units and of the formula

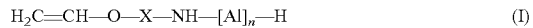

where
$[Al]_n$ is a linear or branched oligoalkylenimine chain having n alkylenimine units,
n is a number which is at least 1 and
X is a straight-chain or branched $C_2$- to $C_6$-alkylene group, and salts of the monomers I with mineral acids or organic acids and quaternization products of the monomers I with alkyl halides or dialkyl sulfates.

Polymers which comprise monomers with the formula I incorporated in the form of polymerized units are used, for example, as fixing agents in the production of paper, as antimicrobial coating materials, in detergents and for the treatment of metal surfaces.

It is the object of the invention to provide further polymers having alkylenimine units.

The object is achieved, according to the invention, by graft polymers which comprise alkylenimine units as side chains and whose base polymer is selected from the group consisting of polymers having vinylamine units, polyamines, polyamidoamines and polymers of ethylenically unsaturated acids, if they comprise exclusively oligoalkylenimine side chains as alkylenimine units.

The oligoalkylenimine side chains comprise, for example, from 2 to 50 alkylenimine units, in general from 3 to 30 alkylenimine units, preferably from 3 to 15 alkylenimine units. Oligoalkylenimine side chains which comprise from 5 to 10 alkylenimine units are particularly preferred. Linear oligoalkylenimine side chains $[Al]_n$ can be described, for example, with the aid of the following formula

where n is a number of at least 2 and R' and R" are monovalent organic radicals, such as $C_1$- to $C_4$-alkyl, phenyl or hydrogen. R' and R" are preferably hydrogen. In addition, branched oligoalkylenimine side chains $[Al]_n$ are suitable. They can be characterized, for example, with the aid of the following formula

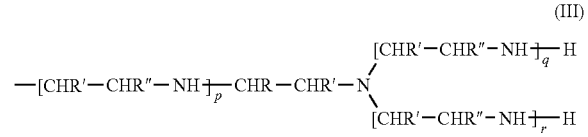

where p is 0 or an integer other than 0, i.e. 1, 2, 3, etc., q and r, independently of one another, are integers other than 0 and the sum $p+q+r+1=n$, where n is at least 2 to 50, in general 3 to 30, preferably 3 to 15 and in particular 5 to 10. The formula III represents a singly branched oligoalkylenimine unit $[Al]_n$ but multiple branchings are also possible.

Graft polymers whose oligoalkylenimine side chains consist of ethylenimine units are particularly preferred.

The oligoalkylenimine side chains may be present in the form of the free bases or as salts. For example, mineral acids, such as hydrochloric acid, sulfuric acid, phosphoric acid, phosphonic acid or nitric acid, and saturated organic acids, such as formic acid, acetic acid, propionic acid, benzenesulfonic acid, amidosulfonic acid or p-toluenesulfonic acid, are suitable for salt formation. The nitrogen atoms of the side chains can be completely or partly neutralized with an acid. In addition, it is possible for them to be present in quaternized form. They can be partly or completely quaternized, for example, with methyl chloride, ethyl chloride, n-propyl chloride, isopropyl chloride, n-butyl chloride, sec-butyl chloride, n-hexyl chloride, cyclohexyl chloride, benzyl chloride, methyl bromide, methyl iodide, ethyl bromide, ethyl iodide, dimethyl sulfate or diethyl sulfate.

The graft polymers according to the invention comprise, for example, from 1 to 100 mol %, in general from 20 to 80 mol %, preferably from 30 to 60 mol %, of at least one oligoalkylenimine per functional monomer unit in the base polymer. Functional monomer unit in the base polymer is to be understood as meaning, for example, vinylamine units in the case of the polymers comprising vinylamine units or primary or secondary amino groups in the case of the amines or polyamidoamines, and acid groups, preferably carboxyl groups, in the case of the polymers having acid groups.

The invention also relates to a process for the preparation of graft polymers having oligoalkylenimine side chains, at least one oligoalkylenimine which comprises a terminal aziridine group being grafted onto a grafting base selected from the group consisting of polymers having vinylamine units, polyamines, polyamidoamines and polymers of ethylenically unsaturated acids.

Oligoethylenimines which comprise a terminal aziridine group are preferably used as the oligoalkylenimine. Together with the aziridine group, the oligoalkylenimines consist of from 2 to 50 alkylenimine units, in general from 3 to 30, preferably from 3 to 15 and in particular from 5 to 10, alkylenimine units. The preparation of such compounds is known, cf. U.S. Pat. No. 3,492,289 mentioned above in relation to the prior art.

For example, polymers having vinylamine units, polyamines, polyamidoamines and polymers of ethylenically unsaturated acids are suitable as the grafting base onto which at least one oligoalkylenimine which has an intact aziridine group is grafted. The molar mass $M_w$ (determined with the aid of gel permeation chromatography) of these polymers is, for example, from 500 to 1 million, preferably from 1000 to 500 000, in particular from 2000 to 350 000.

Polymers comprising vinylamine units are obtainable by hydrolysis of polymers comprising vinylformamide units. Polyvinylamines are prepared, for example, by hydrolysis of homopolymers of N-vinylformamide, the degree of hydrolysis being, for example, up to 100%, in general from 70 to 95%. Copolymers of N-vinylformamide with other ethylenically unsaturated monomers, such as vinyl acetate, vinyl propionate, methyl acrylate, methyl methacrylate, acrylamide, acrylonitrile and/or methacrylonitrile, can be hydrolyzed to polymers comprising vinylamine units and can be used according to the invention as the grafting base. The polymers comprising vinylamine units are cationic. In the hydrolysis of polymers of N-vinylformamide with acids, the salts of the polymers (ammonium salts) form, while polymers carrying amino groups form in the hydrolysis with bases, such as sodium hydroxide solution or potassium hydroxide solution. The preparation of homo- and copolymers of N-vinylformamide and the preparation of the polymers obtainable therefrom by hydrolysis and having amino or ammonium groups are known. They are described in detail, for example, in U.S. Pat. No. 6,132,558, column 2, line 36 to column 5, line 25. The statements made there are hereby incorporated in the disclosure content of the present application by reference.

From this group of base polymers, polymers which have vinylamine units and comprise at least 50 mol % of vinylamine units are preferably used.

Polyamidoamines are also suitable as the grafting base. As is known, they are prepared by condensation of polycarboxylic acids, preferably dicarboxylic acids, with polyamines. For example, at least one dicarboxylic acid having 4 to 10 carbon atoms in the molecule is subjected to condensation with at least one polyalkylenepolyamine which comprises from 3 to 10 basic nitrogen atoms in the molecule. Suitable dicarboxylic acids are, for example, succinic acid, maleic acid, adipic acid, glutaric acid, suberic acid, sebacic acid or terephthalic acid. Examples of polyalkylenepolyamines are diethylenetriamine, triethylenetetramine, tetraethylenepentamine, dipropylenetriamine, tripropylenetetramine, dihexamethylenetriamine, dipropylenetriamine, tripropylenetetramine, dihexamethylenetriamine, aminopropylethylenediamine and bisaminopropylethylenediamine. In the preparation of polyamidoamines it is of course also possible to use mixtures of polycarboxylic acids or mixtures of polyalkylenepolyamines. In order to prepare polyamidoamines, at least one dicarboxylic acid and at least one polyalkylenepolyamine are heated to relatively high temperatures, for example to a temperature in the range from 120 to 220° C., in general in the range from 130 to 180° C. The water forming during the condensation is removed from the reaction mixture. Lactones or lactams or carboxylic acids having 4 to 8 carbon atoms can, if appropriate, also be used in the condensation. For example, from 0.8 to 1.4 mol of a polyalkylenepolyamine are used per mole of a dicarboxylic acid.

Modified polyamidoamines can also be used as the grafting base. The modified polyamidoamines include, for example, crosslinked polyamidoamines which are obtainable by reaction of polyamidoamines with at least one crosslinking agent with the formation of water-soluble products. Suitable crosslinking agents are, for example, epichlorohydrin or bis-chlorohydrin ethers of alkylene glycols and/or polyalkylene glycols. The polyalkylene glycols may comprise, for example, from 2 to 100 alkylene oxide units.

Further examples of modified polyamidoamines are polyamidoamines which have been grafted with ethylenimine and reacted with at least one crosslinking agent to give water-soluble products. In order to graft polyamidoamines with ethylenimine, they are reacted, for example in the presence of sulfuric acid or boron trifluoride etherates as a catalyst, in an aqueous medium with ethylenimine at temperatures of from 80 to 100° C. Compounds of this type are described, for example, in DE-B 24 34 816.

In addition, polyalkylenepolyamines, e.g. polyalkylenepolyamines having molar masses $M_w$ of, for example, from 300 to 15 000, preferably from 1000 to 12 000, and polyethylenimines are suitable as the grafting base for the preparation of the products according to the invention.

Other suitable grafting bases are homo- and/or copolymers of ethylenically unsaturated acids. Examples of these are polymers of ethylenically unsaturated $C_3$- to $C_5$-carboxylic acids, such as acrylic acid, methacrylic acid, maleic acid, itaconic acid, fumaric acid, crotonic acid, vinyllactic acid or vinylacetic acid, acrylamidomethylpropanesulfonic acid or vinylphosphonic acid. Polyacrylic acid, polymethacrylic acid, copolymers of acrylic acid and methacrylic acid and copolymers of acrylic acid and maleic acid are preferred from this group of polymers.

In the graft polymerization, for example, from 1 to 100 mol %, in general from 20 to 80 mol % and preferably from 30 to 60 mol % of at least one oligoalkylenimine which comprises an intact aziridine ring are used per functional monomer unit in the grafting base.

The preparation of the products according to the invention is preferably effected in an aqueous medium in the presence of a catalyst, for example a mineral acid, such as hydrochloric acid or sulfuric acid. The pH of the reaction mixture is, for example, in the range from 5.5 to 12, preferably from 6 to 11.

The reaction is carried out, for example, in such a way that first the catalyst is added to an aqueous solution of the grafting base, the mixture is heated to the reaction temperature and then the oligoalkylenimine which has an intact terminal aziridine group is metered in continuously or batchwise. The reaction temperature is, for example, in the range from 55 to 110° C., preferably from 85 to 100° C. The duration of the reaction is mainly dependent on the size of the batch and the reaction temperature. It is, for example, in the range from 30 minutes to 2 hours. The end point of the reaction, i.e. the time when aziridine groups are no longer detectable in the reaction mixture, can be determined with the aid of the reaction of aziridines with 4-(4-nitrobenzyl)pyridine, cf. R. Preussmann, H. Schneider and F. Epple, Arzneimittel-Forschung, Volume 19, 1059-1073 (1969). In this test, aziridine groups are recognized on the basis of an intense violet color. If the test is negative, the reaction is complete. The reaction mixture can be used directly. However, it is also possible to isolate the graft products according to the invention from the reaction mixture.

With the aid of the process according to the invention, it is possible to prepare graft polymers having defined side chains. A further advantage of this process is that the formation of homopolymers as a byproduct is greatly suppressed compared with the grafting of ethylenimine. The process according to the invention gives graft products in which the molecular weight distribution of the graft branches is by far not as broad as in the case of the grafting with ethylenimine.

The graft polymers according to the invention which comprise exclusively oligoalkylenimine side chains as alkylenimine units are used, for example, as process chemicals in the production of paper. Graft polymers having molar masses $M_w$ (determined with the aid of gel permeation chromatography) of up to 30 000 are suitable in particular as fixing agents for pitch and crill in papermaking. The graft polymers according to the invention can also be used as antimicrobial coating materials, as builders in detergents and for the treatment of metal surfaces.

EXAMPLES

The polymers were characterized by means of gel permeation chromatography (GPC) and in some cases coupled with multi-angle laser light scattering (GPC-MALLS).

The amine number was determined by potentiometric titration according to DIN 53176.

The end point of the reaction with aziridine-containing species was determined with the aid of the reaction with 4-(4-nitrobenzyl)pyridine, cf. R. Preussmann, H. Schneider and F. Epple, Arzneimittel-Forschung, Volume 19, 1059-1073 (1969). Aziridines are recognized in said test with 4-(4-nitrobenzyl)pyridine owing to an intense violet color. If this test (referred to in the following text as "Preussmann test") is negative, the reaction is complete.

Synthesis of oligomeric ethylenimine having a terminal ethylenimine group 150 g of demineralized water were initially taken in a 1 l four-necked flask which was equipped with a jacketed coil condenser, thermometer, 250 ml dropping funnel, 500 ml dropping funnel and gassing nozzle with $N_2$ connection and heated to 55° C. In the course of 1 hour, 450 g of a 60% aqueous ethylenimine solution and a mixture of 6.5 g of 37% strength hydrochloric acid and 152 g of demineralized water were then added simultaneously. Thereafter, the reaction mixture was stirred for a further 4 hours at 55° C. Thereafter, the mixture was cooled to 15° C. and 11.6 g of a 25% strength aqueous sodium hydroxide solution were added. The product was then introduced into a glass vessel and stored therein at 5° C. The degree of oligomerization n (determined with the aid of $^1$H-NMR spectroscopy) was 6.84.

Oligoethylenimines having a terminal ethylenimine group, whose degree of oligomerization n had the following values:
n=4.4
n=4.7 and
n=6.0
were prepared analogously.

Example 1

In a 500 ml four-necked flask which was equipped with a reflux condenser, dropping funnel and thermometer, 26.2 g of a 17% strength aqueous solution of a polyvinylformamide which had a degree of hydrolysis of 95%, comprised 95 mol % of vinylamine units and 5 mol % of vinylformamide units and had a molar mass $M_n$ (GPC) of 2000 gmol$^{-1}$ and a molar mass $M_w$ (GPC) of 4100 gmol$^{-1}$ were initially taken, adjusted to pH 6.0 by addition of 1.06 g of 37% strength hydrochloric acid and heated to a temperature of 95° C. 204.0 g of a 35.1% strength aqueous solution of an oligoethylenimine which comprised a terminal ethylenimine group and had a degree of oligomerization n of 4.7 were metered in the course of 1 hour. The reaction mixture was stirred for a further hour at 95° C. Thereafter, the reaction was complete (Preussmann test negative). The reaction product had a molar mass $M_n$ (GPC) of 2500 and a molar mass $M_w$ (GPC) of 5800.

Example 2

In a 500 ml four-necked flask which was equipped with a reflux condenser, dropping funnel and thermometer, 56.9 g of a 57.4% strength aqueous solution of a polyamidoamine ($M_n$ (GPC)=1950 gmol$^{-1}$, $M_w$=3290 gmol$^{-1}$) prepared from diethylenetriamine and adipic acid were initially taken, adjusted to pH 5.9 with 21.5 g of 37% strength hydrochloric acid and heated to a temperature of 95° C. 230.0 g of a 35.1% strength aqueous solution of an oligoethylenimine which had a terminal ethylenimine group and a degree of oligomerization of 6.84 were then added in the course of one hour. The reaction mixture was then stirred for a further 2 hours at a temperature of 95° C. The reaction was then complete (Preussmann test negative). The pH of the reaction mixture was 11. The polymer had an amine number of 293 mg KOH/g, a molar mass $M_n$ (GPC) of 4900 gmol$^{-1}$ and a molar mass $M_w$ (GPC) of 10 500 gmol$^{-1}$.

Example 3

In a 500 ml four-necked flask which was equipped with a reflux condenser, dropping funnel and thermometer, 74.6 g of a 57.4% strength aqueous solution of a polyamidoamine ($M_n$ (GPC)=1370 gmol$^{-1}$, $M_w$ (GPC)=2280 gmol$^{-1}$) prepared from diethylenetriamine and adipic acid were initially taken, adjusted to pH 6.0 with 23.2 g of 37% hydrochloric acid and heated to a temperature of 95° C. In the course of one hour, 273.9 g of a 33.2% strength aqueous solution of an oligoethylenimine which had a terminal ethylenimine group and a degree of oligomerization n of 6.0 were metered in. After addition of the oligoethylenimine, the reaction mixture was stirred for a further 2 hours at a temperature of 95° C. The reaction was complete at this time (Preussmann test negative). The pH of the reaction mixture was 10.2. The polymer had an amine number of 297 mg KOH/g, a molar mass $M_n$ (GPC) of 3500 gmol$^{-1}$ and a molar mass $M_w$ (GPC) of 7400 gmol$^{-1}$.

Example 4

In a 500 ml four-necked flask having a reflux condenser, dropping funnel and thermometer, 26.2 g of a 17% strength aqueous solution of a polyvinylformamide which had a degree of hydrolysis of 95%, comprised 95 mol % of vinylamine units and 5 mol % of vinylformamide units and had a molar mass $M_n$ (GPC) of 3100 gmol$^{-1}$ and a molar mass $M_w$ (GPC) of 8100 gmol$^{-1}$ were initially taken, adjusted to pH 6.0 by addition of 1.06 g of 37% strength hydrochloric acid and heated to a temperature of 95° C. 230.0 g of a 35.1% strength aqueous solution of an oligoethylenimine which had a terminal ethylenimine group and had a degree of oligomerization of 6.84 were then added in the course of one hour. The reaction mixture was then stirred for a further hour at a temperature of 95° C. After this time, the reaction was complete (Preussmann test negative). The pH of the reaction mixture was 11. The polymer had an amine number of 357 mg KOH/g, a molar mass $M_n$ (GPC) of 8500 and a molar mass $M_w$ (GPC) of 24 000.

Example 5

In a 500 ml four-necked flask which was equipped with a reflux condenser, dropping funnel and thermometer, 100.0 g of a 18% strength aqueous solution of a polyvinylformamide which had a degree of hydrolysis of 95%, comprised 95 mol % of vinylamine units and 5 mol % of vinylformamide units and had a molar mass $M_n$ (GPC) of 112 000 gmol$^{-1}$ and a molar mass $M_w$ (GPC) of 510 000 gmol$^{-1}$ and $M_w$ (MALLS) of 240 000 were initially taken, adjusted to pH 5.9 by addition of 5.6 g of 37% strength hydrochloric acid and heated to a temperature of 95° C. 230.0 g of a 35.1% strength aqueous solution of an oligoethylenimine which had a terminal ethylenimine group and had a degree of oligomerization of 6.84 were then added in the course of one hour. The reaction mixture was then stirred for a further hour at a temperature of 95° C. The reaction was then complete (Preussmann test negative). The pH of the reaction mixture was 11. The polymer had an amine number of 292 mg KOH/g, and the following values were determined for the molar masses:
$M_n$ (GPC)=310 000
$M_w$ (GPC)=570 000
$M_w$ (MALLS)=390 000.

Example 6

In a 1 l four-necked flask which was equipped with a reflux condenser, dropping funnel and thermometer, 40.2 g of an 18.8% strength aqueous solution of a polyvinylformamide which had a degree of hydrolysis of 97%, comprised 97 mol % of vinylamine units and 3 mol % of vinylformamide units and had a molar mass $M_n$ (GPC) of 34 000 gmol$^{-1}$ and molar masses $M_w$ (GPC) of 91 000 gmol$^{-1}$ and $M_w$ (MALLS) of 54 000 were initially taken, adjusted to pH 5.5 with hydrochloric acid and heated to 95° C. 200.0 g of a 45% strength aqueous solution of an oligoethylenimine which comprised a terminal ethylenimine group and had a degree of oligomerization of 4.4 were then added in the course of one hour. The reaction mixture was stirred for a further hour at a temperature of 95° C. The reaction was then complete (Preussmann test negative). The pH of the reaction mixture was 10.2. The polymer had an amine number of 326 mg KOH/g, a molar mass $M_n$ (GPC) of 200 000 and a molar mass $M_w$ (GPC) of 235 000.

We claim:

1. A graft polymer, comprising:
    one or more alkylenimine units as side chains, said alkylenimine units consisting of oligoalkylenimine side chains; and
    a grafting base selected from the group consisting of a polymer comprising vinylamine units, a polyamine, a polyamidoamine and a polymer of ethylenically unsaturated acids, wherein:
    the alkylenimine units do not include any detectible aziridine groups;
    the oligoalkylenimine side chains are grafted to the grafting base by a grafting-onto process in which an oligoalkylenimine comprising a terminal aziridine group reacts with a functional monomer unit in the grafting base;
    the oligoalkylenimine comprising the terminal aziridine is formed by polymerizing ethylenimine;
    the oligoalkylenimine side chains are represented by formula (III):

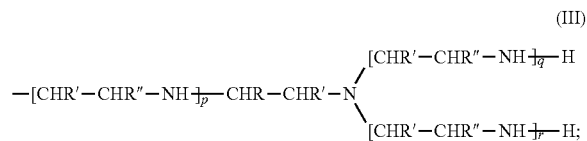

p is 0 or an integer greater than zero;
q and r independently of one another, are integers greater than 0;
a sum p+q+r+1=n, where n is at least 3;
R' and R" independently represent hydrogen or a monovalent organic radical; and
the grafting base is not a polyethyleneimine.

2. The graft polymer according to claim 1, wherein the oligoalkylenimine side chains comprise from 2 to 50 alkylenimine units.

3. The graft polymer according to claim 1, wherein the oligoalkylenimine side chains comprise from 3 to 30 alkylenimine units.

4. The graft polymer according to claim 1, wherein the oligoalkylenimine side chains comprise from 3 to 15 alkylenimine units.

5. The graft polymer according to claim 1, wherein the oligoalkylenimine side chains consist of ethylenimine units.

6. An antimicrobial coating material, comprising the graft polymer according to claim 1.

7. The graft polymer according to claim 1, wherein the grafting base is selected from the group consisting of polymers having vinylamine units, polyamines, and polyamidoamines.

8. The graft polymer according to claim 1, wherein the grafting base is a polymer having vinylamine units.

9. The graft polymer according to claim 1, wherein the grafting base is a polyamine.

10. The graft polymer according to claim 1, wherein the grafting base is a polyamidoamine.

11. The graft polymer according to claim 1, wherein the grafting base is a polymer of ethylenically unsaturated acids.

12. A process for preparing the graft polymer of claim 1, the process comprising grafting the oligoalkyleneimine side chains onto the grafting base, such that the oligoalkyleneimine comprising the terminal aziridine group reacts with the functional monomer unit in the grafting base.

13. A reaction mixture, comprising a graft polymer comprising:
one or more alkylenimine units as side chains, said alkyleneimine units consisting of ologoalkylenimine side chains; and
a grafting base selected from the group consisting of a polymer comprising vinylamine units, a polyamine, a polyamidoamine and a polymer of ethylenically unsaturated acids;
wherein:
the reaction mixture does not include any detectible aziridine groups;
the oligoalkylenimine side chains are grafted to the grafting base by a grafting-onto process in which an oligoalkylenimine comprising a terminal aziridine group reacts with a functional monomer unit in the grafting base;
the oligoalkylenimine comprising the terminal aziridine is formed by polymerizing ethylenimine;
the oligoalkyleneimine side chains are represented by formula (III):

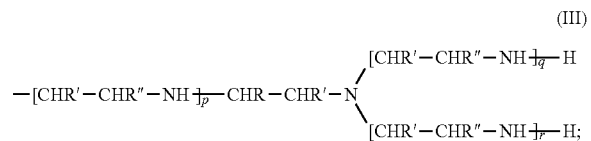

p is 0 or an integer;
q and r independently of one another, are integers;
a sum p+q+r+1=n, where n is at least 3; and R' and R" independently represent hydrogen or a monovalent organic radical; and the grafting base is not a polyethyleneimine.

14. The graft polymer according to claim 1, wherein n is from 3 to 50.

15. The graft polymer according to claim 1, wherein n is from 3 to 30.

16. The graft polymer according to claim 1, wherein n is from 3 to 15.

17. The graft polymer according to claim 1, wherein n is from 5 to 10.

18. The graft polymer according to claim 13, wherein n is from 3 to 50.

19. The graft polymer according to claim 13, wherein n is from 3 to 30.

20. The graft polymer according to claim 13, wherein n is from 3 to 15.

21. The graft polymer according to claim 13, wherein n is from 5 to 10.

* * * * *